(12) United States Patent
De Bruijn et al.

(10) Patent No.: US 11,877,135 B2
(45) Date of Patent: Jan. 16, 2024

(54) AUDIO APPARATUS AND METHOD OF AUDIO PROCESSING FOR RENDERING AUDIO ELEMENTS OF AN AUDIO SCENE

(71) Applicant: KONINKLIJKE PHILIPS N.V., Eindhoven (NL)

(72) Inventors: Werner Paulus Josephus De Bruijn, Utrecht (NL); Nathan Souviraa-Labastie, Mons-en-Baroeul (FR)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/104,837

(22) Filed: Feb. 2, 2023

(65) Prior Publication Data

US 2023/0179919 A1    Jun. 8, 2023

Related U.S. Application Data

(63) Continuation of application No. 17/269,283, filed as application No. PCT/EP2019/072195 on Aug. 20, 2019, now Pat. No. 11,582,556.

(30) Foreign Application Priority Data

Aug. 28, 2018 (EP) .................................. 18191241

(51) Int. Cl.
 *H04R 3/12* (2006.01)
 *H04R 5/04* (2006.01)
 *H04R 5/033* (2006.01)

(52) U.S. Cl.
 CPC ............... *H04R 5/04* (2013.01); *H04R 3/12* (2013.01); *H04R 5/033* (2013.01); *H04R 2420/01* (2013.01)

(58) Field of Classification Search
 None
 See application file for complete search history.

(56) References Cited

U.S. PATENT DOCUMENTS 10,812,926 B2    10/2020  Asada et al.
2006/0109988 A1   5/2006  Metcalf
2019/0116450 A1   4/2019  Tsingos

FOREIGN PATENT DOCUMENTS

GB       2550877 A1    12/2017
WO    2014165326 A1    10/2014

OTHER PUBLICATIONS

U.S. Appl. No. 62/574,076 specification and drawings (Year: 2017).*
(Continued)

*Primary Examiner* — James K Mooney

(57) ABSTRACT

An audio apparatus and method employ a first renderer circuit, wherein the first renderer circuit is arranged to render audio elements by generating a first set of audio signals for a set of loudspeakers; and a second renderer circuit, wherein the second renderer circuit is arranged to render audio elements by generating a second set of audio signals for headphones, and select between the first renderer circuit and the second renderer circuit such that the rendering of at least a first part of a first audio element is in response to a first audio rendering property indicator which is received in an audio signal. The first audio rendering property indicator is indicative of whether the first part of the first audio element should be rendered via the loudspeakers, or rendered via the headphones.

20 Claims, 2 Drawing Sheets

(56) References Cited

OTHER PUBLICATIONS

International Search Report and Written Opinion From PCT/EP2019/072195 dated Oct. 18, 2019.

\* cited by examiner

AUDIO APPARATUS AND METHOD OF AUDIO PROCESSING FOR RENDERING AUDIO ELEMENTS OF AN AUDIO SCENE

CROSS-REFERENCES TO RELATED APPLICATIONS

This application is a continuation of U.S. patent application Ser. No. 17/269,283, filed on 18 Feb. 2021, which is the U.S. National Phase application under 35 U.S.C. § 371 of International Application No. PCT/EP2019/072195, filed on Aug. 20, 2019, which claims the benefit of EP Patent Application No. EP 18191241.1, filed on Aug. 28, 2018. These applications are hereby incorporated by reference herein.

FIELD OF THE INVENTION

The invention relates to an audio apparatus and method of audio processing, and in particular, but not exclusively, to using such to support an Augmented/Virtual Reality application.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in being based on a predetermined model of the scene, and typically on an artificial model of a virtual world. In some applications, a virtual reality experience may be provided based on real-world capture. In many cases such an approach tends to be based on a virtual model of the real-world being built from the real-world captures. The virtual reality experience is then generated by evaluating this model.

Many current approaches tend to be suboptimal and tend to often have a high computational or communication resource requirement and/or provide a suboptimal user experience with e.g. reduced quality or restricted freedom.

As an example of an application, virtual reality glasses have entered the market which allow viewers to experience captured 360° (panoramic) or 180° video. These 360° videos are often pre-captured using camera rigs where individual images are stitched together into a single spherical mapping. Common stereo formats for 180° or 360° video are top/bottom and left/right. Similar to non-panoramic stereo video, the left-eye and right-eye pictures are compressed, e.g. as part of a single H.264 video stream.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For audio, the focus has until now mostly been on headphone reproduction using binaural audio rendering technology. In many scenarios, headphone reproduction enables a highly immersive, personalized experience to the user. Using headtracking, the rendering can be made responsive to the user's head movements, which highly increases the sense of immersion.

Recently, both in the market and in standards discussions, use cases are starting to be proposed that involve a "social" or "shared" aspect of VR (and AR), i.e. the possibility to share an experience together with other people. These can be people at different locations, but also people in the same location (or a combination of both). For example, several people in the same room may share the same VR experience with a projection (audio and video) of each participant being present in the VR content/scene. For example, in a game where multiple people participate, each player may have a different location in the game-scene and consequently a different projection of the audio and video scene.

As a specific example, MPEG attempts to standardize a bit stream and decoder for realistic, immersive AR/VR experiences with six degrees of freedom. Social VR is an important feature and allows users to interact in a shared environment (gaming, conference calls, online shopping, etc.). The concept of social VR also facilitates making a VR experience a more social activity for users physically in the same location but where e.g. a head mounted display or other VR headset provides a perceptional isolation from the physical surroundings.

A disadvantage of headphone reproduction in such "social" or "shared" AR (or VR) use cases is that with each user wearing individual headphones, the users that are in the same location (e.g. room) are at least partly acoustically isolated from each other, which diminishes the "social" part of the experience (for instance, it becomes difficult or awkward for people standing next to each other to have a natural conversation).

This may be addressed by using loudspeakers instead of headphones for the audio reproduction. However, this has the disadvantage that the audio reproduction cannot be as freely adapted and customized to the individual user. For example, it makes it difficult to dynamically adapt the audio reproduction to the head movements, and specifically to changes in the head orientation of each individual user. Such an effect is very important for an immersive experience and loudspeakers therefore tend to be suboptimal for generating an optimized user experience.

Hence, an improved approach for audio processing, in particular for a virtual/augmented/mixed reality experience/application, application, would be advantageous. In particular, an approach that allows improved operation, increased flexibility, reduced complexity, facilitated implementation, an improved audio experience, a more consistent perception of an audio and visual scene, improved customization, improved personalization; an improved virtual reality experience, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio apparatus comprising: a receiver for receiving data describing an audio scene, the data comprising audio data for a set of audio elements corresponding to audio sources in the scene and metadata comprising at least a first audio rendering property indicator for a first audio element of the set of audio elements; a first renderer for rendering audio elements by generating a first set of audio signals for a set of loudspeakers; a second renderer for rendering audio elements by generating a second set of audio signals for a headphone; and a selector arranged to select between the first renderer and the second renderer for rendering of at least a first part of the first audio element in response to the first audio rendering property indicator; wherein the audio rendering property indicator is indicative of whether the first part of the first audio element is associated with a listener pose dependent position or with a listener pose non-dependent position.

The approach may provide an improved user experience in many embodiments and may specifically provide an improved user experience for many virtual reality (including augmented and mixed reality) applications, including specifically social or shared experiences. The approach may provide improved performance using hybrid rendering. For example, in many embodiments, it may allow users in the same room to more easily talk directly while still providing a targeted and personalized rendering of the audio scene.

The audio rendering property indicator may indicative whether the first audio element represents an audio source with a spatial property that is fixed to head orientation or is not-fixed to head orientation (corresponding listener pose dependent position and listener pose non-dependent position respectively). The approach may reduce complexity and resource requirements.

In some embodiments, the apparatus may comprise a first driver for driving the set of loudspeakers from the first set of audio signals and a second driver for driving the headphones from the second set of audio signals. The first set of audio signals may specifically be a set of surround signals and the second set of audio signals may specifically be a binaural stereo signal.

The first audio rendering property indicator may be indicative of a property of the rendering to be applied to the first audio element or a property of the first audio element.

In accordance with an optional feature of the invention, the apparatus further comprises a listener pose receiver for receiving a listener pose indicative of a pose of a listener, and the first renderer is arranged to generate the first set of audio signals independently of the listener pose and the second renderer is arranged to generate the second set of audio signals in response to the listener pose.

The audio apparatus may provide a highly advantageous and flexible user experience allowing close consistency between e.g. listener movement and the perceived audio scene. A pose may refer to position and/or orientation data, and may also be referred to as a placement. A listener pose may be a position indication for a listener, an orientation indication for a listener, or a combined position and orientation indication for a listener. A pose/placement may be represented by one or more values providing an indication of a position and/or direction.

In accordance with an optional feature of the invention, the apparatus is arranged to generate audio signals for a plurality of listeners wherein the first renderer is arranged to generate the first set of audio signals as a common set of audio signals for the plurality of listeners; and the second renderer is arranged to generate the second set of audio signals for headphones for a first listener of the plurality of listeners and to generate a third set of audio signals for headphones for a second listener of the plurality of listeners.

The audio apparatus may provide an advantageous support for multiple users. In many applications, improved support may be achieved for low complexity and resource usage yet providing an attractive user experience with often a consistent and natural perception of the audio stage.

The second set of audio signals may be generated in response to a first listener pose for the first listener and the third set of audio signals may be generated in response to a second listener pose for the second listener. The first set of audio signals may be generated independently of listener poses.

In accordance with an optional feature of the invention, the first part is a frequency subrange of the first audio element.

This may provide improved performance in many embodiments.

In accordance with an optional feature of the invention, the selector is arranged to select different renderers of the first renderer and the second renderer for the first part of the first audio element and for a second part of the first audio element.

This may provide an improved user experience in many embodiments. The selector may specifically be arranged to select different renderers for different frequency ranges of the first audio element.

This may provide an efficient approach in many applications. The audio rendering property indicator may be indicative of whether the first audio element is diegetic or not.

In accordance with an optional feature of the invention, the audio rendering property indicator is indicative of an audio format of the first audio element.

This may provide an improved user experience in many embodiments. The audio rendering property indicator may be indicative of an audio format from a set of audio formats including at least one audio format from the group of: an audio object format; a Higher Order Ambisonics audio format; and an audio channel signal audio format.

In accordance with an optional feature of the invention, the audio rendering property indicator is indicative of an audio source type for the first audio element.

This may provide an improved user experience in many embodiments. The audio rendering property indicator may be indicative of an audio source type from a set of audio source types including at least one audio source type from the group of: speech audio; music audio; foreground audio; background audio; voice over audio; and narrator audio.

In accordance with an optional feature of the invention, wherein the audio rendering property indicator is indicative of a guidance rendering property for the rendering of the rendering of the first audio element.

This may provide an improved user experience and/or performance in many embodiments.

In accordance with an optional feature of the invention, the audio rendering property indicator is indicative of whether the first part of the first audio item is intended for rendering over loudspeakers or headphones.

This may provide an improved user experience and/or performance in many embodiments.

In accordance with an optional feature of the invention, the receiver is further arranged to receive visual data indicative of a virtual scene corresponding to the audio scene, and the audio rendering property indicator is indicative of whether the first audio element represents an audio source corresponding to a visual scene object.

This may provide an improved user experience and/or performance in many embodiments.

In some embodiments, the audio rendering property indicator may be indicative of whether the first audio element represents an audio source corresponding to a scene object which is within a viewport determined for a current listener pose.

In accordance with an optional feature of the invention, the apparatus further comprises a user input for receiving a user input and wherein the selector is arranged to select between the first renderer and the second renderer for rendering of at least the first part of the first audio element in response to the user input.

This may provide an improved user experience in many embodiments.

In accordance with an optional feature of the invention, the selector is arranged to determine an audio property of the first audio element and to select between the first renderer and the second renderer for rendering of at least the first part of the first audio element in response to audio property.

This may provide an improved user experience and/or performance in many embodiments.

According to an aspect of the invention there is provided a method of audio processing comprising: receiving data describing an audio scene, the data comprising audio data for a set of audio elements corresponding to audio sources in the scene and metadata comprising at least a first audio rendering property indicator for a first audio element of the set of audio elements; rendering audio elements by generating a first set of audio signals for a set of loudspeakers; rendering audio elements by generating a second set of audio signals for a headphone; and selecting between rendering of at least a first part of the first audio element for the set of loudspeakers and for the headphone in response to the first audio rendering property indicator; wherein the audio rendering property indicator is indicative of whether the first part of the first audio element is associated with a listener pose dependent position or with a listener pose non-dependent position.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
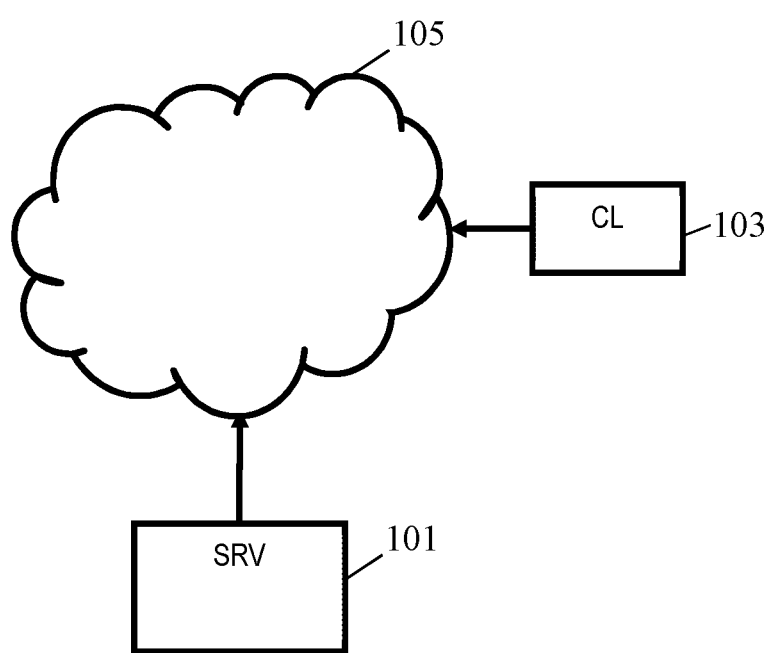
FIG. 1 illustrates an example of a client server based virtual reality system.

Virtual reality (including augmented and mixed reality) experiences allowing a user to move around in a virtual or augmented world are becoming increasingly popular and services are being developed to satisfy such demands. In many such approaches, visual and audio data may dynamically be generated to reflect a user's (or viewer's) current pose.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise up to six values/components/degrees of freedom with each value/component typically describing an individual property of the position/location or the orientation/direction of the corresponding object. Of course, in many situations, a placement or pose may be represented by fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A system or entity based on providing the maximum degree of freedom for the viewer is typically referred to as having 6 Degrees of Freedom (6 DoF). Many systems and entities provide only an orientation or position and these are typically known as having 3 Degrees of Freedom (3 DoF).

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

Similarly, for a given viewer/user/listener pose, an audio representation of the scene may be provided. The audio scene is typically rendered to provide a spatial experience where audio sources are perceived to originate from desired positions. As audio sources may be static in the scene, changes in the user pose will result in a change in the relative position of the audio source with respect to the user's pose. Accordingly, the spatial perception of the audio source should change to reflect the new position relative to the user. The audio rendering may accordingly be adapted depending on the user pose.

The viewer or user pose input may be determined in different ways in different applications. In many embodiments, the physical movement of a user may be tracked directly. For example, a camera surveying a user area may detect and track the user's head (or even eyes (eye-tracking)). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the viewer pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

In some systems, the VR application may be provided locally to a viewer by e.g. a standalone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene. The view images are then transmitted to the device local to the viewer where they are presented. For example, the remote device may directly generate a video stream (typically a stereo/3D video stream) which is directly presented by the local device.

Similarly, the remote device may generate an audio scene reflecting the virtual audio environment. This may in many embodiments be done by generating audio elements that correspond to the relative position of different audio sources in the virtual audio environment with these being rendered to be perceived at the corresponding positions.

For example, a remote device may generate audio data representing an audio scene and may transmit audio components/objects/signals or other audio elements corresponding to different audio sources in the audio scene together with position information indicative of the position of these (which may e.g. dynamically change for moving objects). The audio elements may include elements associated with specific positions but may also include elements for more distributed or diffuse audio sources. For example, audio elements may be provided representing generic (non-localized) background sound, ambient sound, diffuse reverberation etc.

The local VR device may then render the audio elements appropriately, e.g. by applying appropriate binaural processing reflecting the relative position of the audio sources for the audio components.

For the audio side of a VR service, a central server may accordingly in some embodiments generate audio data representing an audio scene, and may specifically represent this audio scene by a number of audio elements that can be rendered by the local client/device.

FIG. 1 illustrates an example of a VR system in which a central server 101 liaises with a number of remote clients 103 e.g. via a network 105, such as e.g. the Internet. The central server 101 may be arranged to simultaneously support a potentially large number of remote clients 103.

Such an approach may in many scenarios provide an improved trade-off e.g. between complexity and resource demands for different devices, communication requirements etc. For example, the viewer pose and corresponding scene data may be transmitted with larger intervals with the local device processing the viewer pose and received scene data locally to provide a real time low lag experience. This may for example substantially reduce the required communication bandwidth while providing a low latency experience and while allowing the scene data to be centrally stored, generated, and maintained. It may for example be suitable for applications where a VR experience is provided to a plurality of remote devices.

Figure 2:
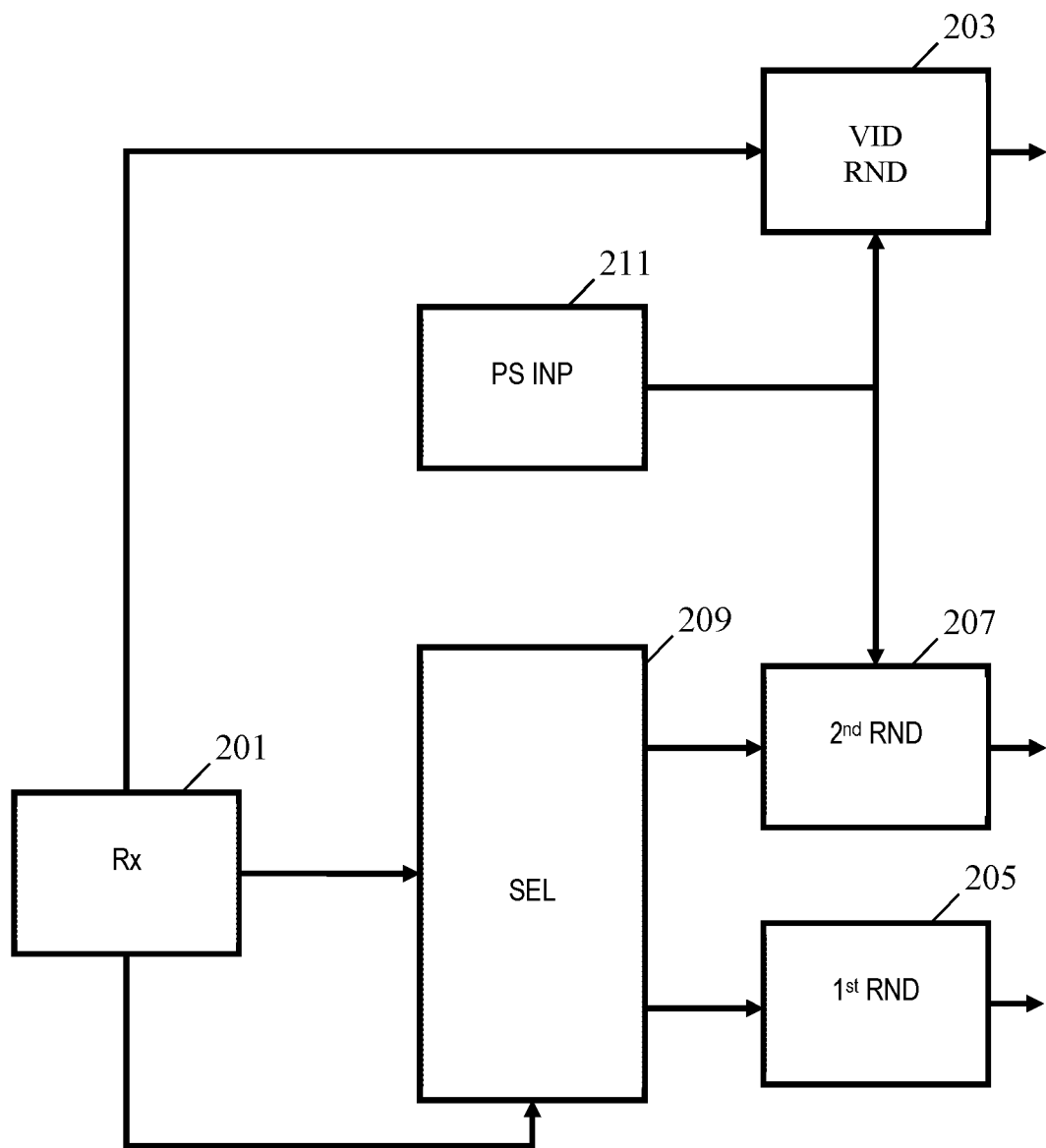
FIG. 2 illustrates an example of elements of an audio apparatus in accordance with some embodiments of the invention.

FIG. 2 illustrates elements of an audio apparatus which may provide an improved audio rendering in many applications and scenarios. In particular, the audio apparatus may provide improved rendering for many VR applications, and the audio apparatus may specifically be arranged to perform the audio processing and rendering for a VR client 103 of FIG. 1.

The audio apparatus of FIG. 2 is arranged to render the audio scene by generating a hybrid set of output signals with a first (sub)set of the output signals being generated to be rendered by a set of loudspeakers and a second (sub)set of output signals being generated to be rendered by headphones. The first set of audio signals may specifically be a set of surround sound signals for rendering on a surround sound speaker set. The second set of audio signals may specifically be a binaural stereo signal for rendering on a pair of headphones.

The audio apparatus of FIG. 2 may be part of a hybrid audio reproduction system for VR/AR that uses a combination of headphone- and loudspeaker reproduction to provide a presentation of an audio scene.

Such an approach may provide advantageous operation in many embodiments. For example, in many scenarios, using a combination of loudspeaker- and headphone reproduction instead of either of the two may provide an AR (or VR/MR) experience that is both highly immersive for each individual user, while at the same time not hampering the "social" or "shared" aspect of the experience. For example, it may allow the audio rendered to be customized to individual users and the current context for the user. For example, it may allow positions of audio sources to be accurately adapted to match the head movements/rotations of the user. At the same time, it may reduce complexity required e.g. for binaural processing as substantial parts of the audio scene may be rendered by lower complexity audio channel/surround sound processing. It may further e.g. be based on using headphones with low attenuation of external sound thereby e.g. facilitating direct interaction between users in the same environment/room.

The following description will focus on embodiments wherein the system renders the audio scene using a combination of a surround loudspeaker set up (e.g. a 5.1 or 7.1 system) that is common to all local users, and individual (open or semi-open) headphones for the individual users (where "individual headphones" means: headphones that render a signal that has been generated or adapted for the user wearing those headphones).

The apparatus will specifically be described with reference to a use case of a "social" or "shared" aspect of VR/AR/MR application with multiple people sharing an experience. These may be at different locations but may more interestingly for the example also be at the same location (e.g. same room). A specific use case example is several people in the same room, sharing the same AR experience that is "projected" within their shared real environment. E.g. a couple sitting together on a couch, watching an immersive movie virtually projected on the wall of their living room. They may wear see-through glasses that enable them to see each other and their environment as well as open headphones allowing both dedicated personalized rendering as well as allowing audio in the environment, including that generated by a surround sound setup to be heard.

The apparatus of FIG. 2 specifically includes a receiver 201 which is arranged to receive data describing the virtual scene. The data may include data providing a visual description of the scene and may include data providing an audio description of the scene. Thus, an audio scene description and a visual scene description may be provided by the received data.

The receiver 201 is coupled to a visual renderer 203 which proceeds to render images corresponding to a viewer's current viewing pose. For example, the data may include spatial 3D image data (e.g. images and depth or a model description of the scene) and from this the visual renderer 203 may generate stereo images (image for the left and right eyes of a user) as will be known to the skilled person. The images may be presented to the user e.g. via individual left and right eye displays of a VR headset.

The received data comprises audio data describing the scene. The audio data specifically comprises audio data for a set of audio elements corresponding to audio sources in the scene. Some audio elements may represent localized audio sources in the scene which are associated with a specific position in the scene (the position may of course be dynamically changing for a moving object). Often, an audio element may represent audio generated by a specific scene object in the virtual scene and may thus represent an audio source at a position corresponding to that of the scene object (e.g. a human speaking).

Other elements may represent more distributed or diffuse audio sources, such as e.g. ambient or background noise which may be diffuse. As another example some audio elements may fully or partially represent non-spatially localized components of audio from localized audio sources, such as for example a diffuse reverberation from a spatially well defined audio source.

The audio elements may be encoded audio data, such as encoded audio signals. The audio elements may be different types of audio elements including different types of signals and components, and indeed in many embodiments the first receiver 201 may receive audio data which defines different types/formats of audio. For example, the audio data may include audio represented by audio channel signals, individual audio objects, Higher Order Ambisonics (HOA) etc.

The audio may for example be represented as encoded audio for a given audio component which is to be rendered. The audio data may further comprise position data which indicates a position of the source of the audio component. The positional data may for example include absolute position data defining a position of the audio source in the scene.

The apparatus further comprises two renderers 205, 207.

A first renderer 205 is arranged to render audio elements over a set of loudspeakers. Specifically, the first renderer 205 may generate a first set of audio signals for a set of loudspeakers where the first set of audio signals is e.g. a set of surround sound signals for a surround sound loudspeaker setup.

The first renderer 205 may thus generate a set of audio signals which is intended to be rendered by a specific spatial loudspeaker configuration. The first renderer 205 may generate a signal for each loudspeaker of a surround sound configuration, and thus for rendering from a specific location corresponding to the speaker position in the configuration.

The first renderer 205 may be arranged to generate the audio signals such that a given audio element is rendered such that the combined effect leads to an impression of the audio element being rendered from the desired position. Typically, the received data may for at least some audio elements include specific position indications and the first renderer 205 may render the audio elements such that they are perceived originate from the indicated position. Other audio elements may e.g. be distributed and diffused and may be rendered as such.

It will be appreciated that many algorithms and approaches for rendering of spatial audio using loudspeakers, and specifically in surround sound systems, will be known to the skilled person and that any suitable approach may be used without detracting from the invention.

For example, the first renderer 205 may generate audio signals for five loudspeakers in a surround sound configuration with a center speaker, left front speaker, right front speaker, left surround speaker, and right surround speaker. The first renderer 205 may generate a set of audio signals comprising an audio signal for each loudspeaker. The signals may then be amplified to generate drive signals for the individual loudspeaker.

In some embodiments, an audio element which is being rendered using the loudspeakers may be received as e.g. a stereo downmix and the first renderer 205 may perform an upmixing to generate the surround signals which in some cases may be rendered directly. Such an approach may for example be useful for audio elements representing diffuse sound that is not directly related to the user pose. For example, an audio element representing generic diffuse ambient audio may be provided as a stereo downmix which can directly be upmixed to provide the appropriate surround sound audio channels. Each of the resulting upmixed signals may be combined with signals for the corresponding speakers generated from other audio elements to generate the set of output signals.

Some audio elements that are rendered via the loudspeaker setup may for example be provided in the form of audio objects. Such an audio object may be represented by audio data describing the specific audio and associated position data which describes the position of the audio source. Based on the position data and the positions of the loudspeakers (whether actual positions or nominal positions for the surround sound speaker setup), the first renderer 205 may determine coefficients for a matrix or vector mapping the audio signal to the different surround sound channels.

In some embodiments, the first renderer 205 may further be arranged to adapt generated audio signals based on acoustic environment data. For example, if data is provided indicating that the current environment is a highly reflective environment (e.g. a bathroom or similar acoustic environment with a high degree of reflections), then the first renderer 205 may generate and apply a filter having an impulse response corresponding to the room transfer function for the environment (first reflections etc.). The filter may in some embodiments be applied to each of the generated audio signals for the individual surround channels or may in some embodiments be applied to the audio element before upmixing to the different audio channels.

In some embodiments, the first renderer 205 may alternatively or additionally be arranged to add reverberation which specifically may be based on environment data received with the audio element. For example, the first renderer 205 may apply a synthetic reverberator, such as a Jot reverberator, with parameters being set depending on the acoustic environment data (e.g. with a reverberation sustain as indicated by the data). The reverberator may typically be applied to the audio element prior to any upmixing or mapping to the surround channels. The second renderer 207 is arranged to generate a second set of audio signals for a headphone. The second set of audio signals may specifically be a binaural stereo signal.

In many embodiments, the audio rendering by the second renderer 207 is a binaural render process using suitable binaural transfer functions to provide the desired spatial effect for a user wearing a headphone. For example, the second renderer 207 may be arranged to generate an audio component to be perceived to arrive from a specific position using binaural processing.

Binaural processing is known to be used to provide a spatial experience by virtual positioning of sound sources using individual signals for the listener's ears. With an appropriate binaural rendering processing, the signals required at the eardrums in order for the listener to perceive sound from any desired direction can be calculated, and the signals can be rendered such that they provide the desired effect. These signals are then recreated at the eardrum using either headphones or a crosstalk cancelation method (suitable for rendering over closely spaced speakers). Binaural rendering can be considered to be an approach for generating signals for the ears of a listener resulting in tricking the human auditory system into thinking that a sound is coming from the desired positions.

The binaural rendering is based on binaural transfer functions which vary from person to person due to the acoustic properties of the head, ears and reflective surfaces, such as the shoulders. For example, binaural filters can be used to create a binaural recording simulating multiple sources at various locations. This can be realized by convolving each sound source with the pair of e.g. Head Related Impulse Responses (HRIRs) that correspond to the position of the sound source.

A well-known method to determine binaural transfer functions is binaural recording. It is a method of recording sound that uses a dedicated microphone arrangement and is intended for replay using headphones. The recording is made by either placing microphones in the ear canal of a subject or using a dummy head with built-in microphones, a bust that includes pinnae (outer ears). The use of such dummy head including pinnae provides a very similar spatial impression as if the person listening to the recordings was present during the recording.

By measuring e.g. the responses from a sound source at a specific location in 2D or 3D space to microphones placed in or near the human ears, the appropriate binaural filters can be determined. Based on such measurements, binaural filters reflecting the acoustic transfer functions to the user's ears can be generated. The binaural filters can be used to create a binaural recording simulating multiple sources at various locations. This can be realized e.g. by convolving each sound source with the pair of measured impulse responses for a desired position of the sound source. In order to create the illusion that a sound source is moved around the listener, a large number of binaural filters is typically required with adequate spatial resolution, e.g. 10 degrees.

The head related binaural transfer functions may be represented e.g. as Head Related Impulse Responses (HRIR), or equivalently as Head Related Transfer Functions (HRTFs) or, Binaural Room Impulse Responses (BRIRs), or Binaural Room Transfer Functions (BRTFs). The (e.g. estimated or assumed) transfer function from a given position to the listener's ears (or eardrums) may for example be given in the frequency domain in which case it is typically referred to as an HRTF or BRTF, or in the time domain in which case it is typically referred to as a HRIR or BRIR. In some scenarios, the head related binaural transfer functions are determined to include aspects or properties of the acoustic environment and specifically of the room in which the measurements are made, whereas in other examples only the user characteristics are considered. Examples of the first type of functions are the BRIRs and BRTFs.

The second renderer 207 may accordingly comprise a store with binaural transfer functions for a, typically high, number of different positions with each binaural transfer function providing information of how an audio signal should be processed/filtered in order to be perceived to originate from that position. Individually applying binaural processing to a plurality of audio signals/sources and combining the result may be used to generate an audio scene with a number of audio sources positioned at appropriate positions in the sound stage.

The second renderer 207 may for a given audio element that is to be perceived to originate from a given position relative to the user's head, select and retrieve the stored binaural transfer function that most closely matches the desired position (or in some case may generate this by interpolating between a plurality of close binaural transfer functions). It may then apply the selected binaural transfer function to the audio signal of the audio element thereby generating an audio signal for the left ear and an audio signal for the right ear.

The generated output stereo signal in the form of the left and right ear signal is then suitable for headphone rendering and may be amplified to generate drive signals that are fed to the headset of a user. The user will then perceive the audio element to originate from the desired position.

It will be appreciated that the audio element may in some embodiments also be processed to e.g. add acoustic environment effects. For example, as described for the first renderer 205, the audio element may be processed to add reverberation or e.g. decorrelation/diffuseness. In many embodiments, this processing may be performed on the generated binaural signal rather than directly on the audio element signal.

Thus, the second renderer 207 may be arranged to generate the audio signals such that a given audio element is rendered such that a user wearing the headphones perceives the audio element to be received from the desired position. Typically, the second renderer 207 may render audio elements such that they are perceived originate from the position indicated in positional data included with the audio data. Other audio elements may e.g. possibly be distributed and diffused and may be rendered as such.

The apparatus may accordingly be part of a client 103 which receives data including audio data describing an audio scene from a central server 101. In many applications, the central server 101 may provide a number audio elements in the form of audio objects, audio channels, audio components, HOAs, audio signals etc. In many situations, some of the audio elements may correspond to a single audio source having a specific position. Other audio elements may correspond to more diffuse and less well defined and more distributed audio sources.

It will be appreciated that many algorithms and approaches for rendering of spatial audio using headphones, and specifically for binaural rendering, will be known to the skilled person and that any suitable approach may be used without detracting from the invention.

The apparatus of FIG. 2 may then be used in a client 103 to process the received audio data to render the desired audio scene. Specifically, it may process each audio element based on the desired position data (when appropriate) and then combine the results.

The apparatus of FIG. 2 accordingly uses two different rendering techniques for generating audio representing the scene. The different rendering techniques may have different properties and the apparatus of FIG. 2 comprises a selector 209 arranged to select which audio elements are rendered by the first renderer 205 and which audio elements are rendered by the second renderer 207. Specifically, for a given first audio element, the selector 211 may select which renderer 205, 207 should be used for rendering. The selector 209 may accordingly receive the first audio element and feed it to the first renderer 205 or the second renderer 207 depending on the selection.

In the system, the receiver 201 is in addition to the audio data (and possibly visual data) arranged to receive metadata comprising audio rendering property indicators for at least one of the audio elements and often for most or indeed all of the audio element. Specifically, at least a first audio rendering property indicator is included for the first audio element.

The selector 209 is arranged to select which renderer to use dependent on the received metadata and the audio rendering property indicators. Specifically, the selector 209 is arranged to consider the first audio rendering property indicator and decide whether the first audio element should be rendered by the first renderer 205 or by the second renderer 207, i.e. whether it should be rendered using the loudspeakers or headphones.

As a low complexity example, the data may for each audio element include encoded audio data as well as metadata comprising a position indication (typically the position of the audio source corresponding to the audio element) and an audio rendering property indicator for the audio element, where the audio rendering property indicator in the specific example simply may be a binary indication of whether the audio element should be rendered by the first renderer 205 or by the second renderer 207. The selector 209 may then evaluate this binary indication and select the indicated renderer 205, 207. The renderer 205, 207 may then generate the appropriate output signals for respectively loudspeakers and headphones such that the audio element(s) are perceived to arrive from a position as indicated by the position indicator. The contribution from each audio element for which the indication is that they should be rendered using the first renderer 205 may then be combined to generate a first set of audio signals for the loudspeakers and the contribution from each audio element for which the indication is that they should be rendered using the second renderer 207 may then be combined to generate a second set of audio signals for the headphones.

In this way, the audio apparatus of FIG. 2 may render the audio scene over a hybrid audio rendering system including both loudspeakers and headphones. Further, the distribution of audio elements over the headphones and loudspeakers can be controlled/guided remotely. For example, the provider of the VR experience may also control and decide how the audio elements should be rendered. As the provider may typically have additional information of the specific nature of the audio source for each audio element, this may allow the selection of how to render each audio element to be controlled based on additional information and knowledge that may not be available at the client. The approach may provide improved rendering in many situations and may provide an improved user experience in many scenarios. The approach may for example provide a precise and natural rendering of the audio scene while e.g. allowing people in the same room to more naturally speak to each other.

Thus, in many embodiments, the audio rendering property indicator may provide guidance to the client and the audio apparatus on how the received audio data should be rendered. The audio rendering property indicator may be indicative of a guidance rendering property for the rendering of the first audio element. The guidance rendering property may in many embodiments be a preferred, suggested, or nominal rendering property that is recommended to be used by the local renderer. Thus, the guidance rendering property may be control data which by the client can be used to set a rendering parameter of the rendering.

In some embodiments, the guidance rendering property may be intended as a mandatory rendering property that must be used when rendering the audio element but in other embodiments the guidance rendering property may be a suggested property that may be used or may not be used by the client. Thus, in many embodiments, the audio apparatus may choose whether to adapt its rendering to match the guidance rendering property or may choose to employ a different value. However, the approach provides an approach that allows the audio apparatus to adapt its operation under guidance of the remote server/provider. This may achieve improved performance in many embodiments as the remote server/provider may have additional information. It may for example also allow a centralized manual optimization or analysis to potentially improve the rendering while still allowing the client to retain freedom and flexibility in the rendering.

In the specific example mentioned above, the audio rendering property indicator is indicative of whether the first audio item is intended for rendering over loudspeakers or whether it is intended for rendering over headphones. The selector 209 may for a first audio element be arranged to select the first renderer 205 for rendering if a first rendering indicator for the first audio element is indicative of the first audio element being intended for rendering by loudspeakers and to select the second renderer 207 for rendering of the first audio element if the first rendering indicator is indicative of the first audio element being intended for rendering by headphones. The selector 209 may then provide it to the selected renderer 205, 207 for rendering.

Thus, in many embodiments, the audio rendering property indicator is indicative of a property of the rendering to be applied to the first audio element, and specifically the rendering indicator for an audio element may be indicative of whether the audio element is intended for rendering by loudspeakers or by headphones.

In some embodiments, it may accordingly be explicitly signaled by metadata in the content stream whether an audio element should be rendered over the loudspeakers or over the headphones in the case that a hybrid reproduction system is used. This may be an explicit artistic choice made by the content producer and may thus provide improved control/guidance for the rendering.

In the apparatus of FIG. 2, the audio rendering may (as well as the visual rendering) be dependent on the viewer pose. Specifically, the apparatus comprises a listener pose receiver 211 which is arranged to receive a listener pose indicative of a pose of the listener. The listener pose may specifically be represented by a headset pose e.g. determined by tracking of a VR headset worn by the user/listener. It will be appreciated that any suitable method for generating, estimating, receiving, and providing a listener pose may be used without detracting from the invention.

The listener pose receiver 211 is connected to the visual renderer 203 and used to generate the visual output corresponding to the specific pose. In addition, the listener pose receiver 211 is coupled to the second renderer 207 and is used in the rendering of the audio elements for the headphone. Thus, the second renderer 207 is arranged to generate the second set of audio signals in response to the listener pose.

The second renderer 207 may specifically perform a binaural rendering such that the audio elements are rendered to be perceived to originate at the appropriate positions with respect to the listeners current orientation and position. For example, for the first audio element, the second renderer 207 may first determine the position in the scene space indicated by the position indication received for the first audio element in the data stream. The relative position of the first audio element with respect to the user may then be determined by analyzing the current listener pose and the corresponding pose in the scene space. The second renderer 207 may then retrieve HRTFs corresponding to this relative position and filter the first audio signal using the retrieved HRTFs to generate binaural stereo signal components for the first audio element. The components may then be added to corresponding components generated from other audio elements to generate output binaural stereo signals.

It will be appreciated that many different approaches for generating headphone signals (and specifically binaural signals) corresponding to audio sources at spatial positions are known and that any such suitable approach or algorithm may be used by the second renderer 207.

In contrast to the second renderer 207, the rendering by the first renderer 205 (i.e. the rendering for the loudspeakers) do not depend on the listener pose and thus the first renderer 205 is in the example of FIG. 2 arranged to generate the first set of audio signals independently of the listener pose.

The first renderer 205 may specifically consider the position indication for an audio element to be rendered by the first renderer 205 and map this to a position in the rendering space of the loudspeakers. The first renderer 205 may then generate the signals for the loudspeakers to provide a spatial perception of the audio element corresponding to the determined position.

It will be appreciated that many different approaches for generating loudspeaker signals (and specifically surround sound signals) corresponding to audio sources at spatial positions are known and that any such suitable approach or algorithm may be used by the first renderer 205.

Thus, in the example, the headphone signals are continuously generated to reflect movement and rotations of the listener's head thereby providing a continuous and consistent user experience. At the same time the rendering using the loudspeakers is unchanged with respect to the movements and rotation of the listeners head which further also provides a consistent approach. The approach may provide an approach wherein the different rendering approaches provide a consistent representation of the audio scene with respect to a non-static listener.

The previous examples have focused on a situation wherein the apparatus generates a representation of the audio scene for a single user. However, in many embodiments, the apparatus may generate a representation of the audio scene for a plurality of users, such as specifically for two or more users located in the same room.

In such a case, the first renderer 205 may be arranged to generate a common set of audio signals for the plurality of users whereas the second renderer 207 is arranged to generate individual headphone signals for each user.

Thus, for audio elements that are selected to be rendered by the first renderer 205, only a single set of output signals are generated for all the users, e.g. only a single loudspeaker signal is generated for each loudspeaker in the configuration and these may typically not depend on any user specific properties. Specifically, the first set of audio signals generated for rendering by the loudspeakers are generated without consideration of any listener poses. The same rendering of the audio scene is generated for all users.

However, for audio elements that are rendered by the second renderer 207, a different set of audio signals may be generated for each user. Specifically, a binaural stereo signal may be generated for each user. These individual signals may be generated to reflect properties or specific characteristics for the individual listener and may specifically be generated to reflect the listener pose of the individual listener. Thus, binaural signals may be generated that reflect the users' current position and orientation.

The apparatus may thus in particular provide a very efficient support for multi-user scenarios. The required audio processing for supporting multiple listeners may be reduced substantially. For example, binaural processing is typically relatively complex and resource consuming and the number of audio signals that need to be generated using binaural processing may be reduced substantially thereby substantially reducing the complexity and computational burden in many embodiments.

Thus, in an example where the apparatus supports two users in the same room, the first renderer 205 may be arranged to generate a common first set of audio signals for rendering using loudspeakers and the second renderer 207 may be arranged to generate a second set of audio signals for headphones for a first listener and to generate a third set of audio signals for headphones for a second listener. The first set of audio signals may be generated independently of the listener pose of the first and second listener, and the second set of audio signals may be generated in response to the listener pose of the first listener and the third set of audio signals may be generated in response to the listener pose of the second listener.

The audio rendering property indicator provided in the received data stream may in different embodiments represent different data.

The audio rendering property indicator is indicative of whether the first part of the first audio element is associated with a listener pose dependent position or with a listener pose non-dependent position. The audio rendering property indicator may specifically be indicative of whether the first audio element is diegetic or not.

As a specific example, in some embodiments, the selector 209 may be arranged to distribute the audio elements across the first renderer 205 and the second renderer 207 based on whether an audio rendering property indicator for the audio element indicates that it is "fixed to head orientation" or "not-fixed to head orientation" in accordance with MPEG terminology.

An audio element indicated by the audio rendering property indicator to be "fixed to head" is an audio element that is intended to have a fixed location relative to the user's head. Such audio elements may be rendered using the second renderer 207 and may be rendered independently of the listener pose. Hence the rendering of such audio elements does not take into account (changes in) the user's head orientation, in other words such audio elements are audio elements for which the relative position does not change when the user turns his head (e.g. non spatial audio such as ambient noise or e.g. music that is intended to follow the user without changing a relative position).

An audio element indicated by the audio rendering property indicator to be "Not-fixed to head" is an audio element that is intended to have a fixed location in the (virtual or real) environment, and so their rendering is dynamically adapted to (changes in) the user's head orientation. In many embodiments this may be more realistic when such an audio element is rendered as a binaural headphone signal which is adapted based on the current listener pose. For example, the perception of a position of an audio source rendered by a surround sound loudspeaker setup may be dependent on the user position and orientation and therefore the rendering of an audio element indicated to be "Not-fixed to head" by such a loudspeaker setup may result in an audio source that is perceived to move when the user moves his head.

Thus, in some embodiments, "not-fixed to head orientation" elements may be rendered over the users' headphones, with their positions adapted for each individual user according to that user's tracked head orientation. The "fixed to head orientation" elements, on the other hand, may be rendered over the loudspeakers and are not adapted to head movements of the users.

The advantage of such an embodiment is that the "fixed to head orientation" elements that are now mostly present via the loudspeakers (and not via the headphones) are mainly responsible for the acoustic isolation that is experienced when all elements are rendered via the headphones. The reasoning here is that the "fixed to head orientation" sounds (mostly music and atmospheric sounds like e.g. crowds, wind, rain, thunder, etc.) are often continuous and spatially omni-present in nature, resulting in a "blanket" of sound that isolates the user from his physical surroundings. The "not-fixed to head orientation" elements, on the other hand, are often more localized and sparse in space and time, and therefore much less "masking" the user's physical acoustic surroundings.

In some practical implements, the user perception of the "fixed to head orientation" sounds that are rendered over the loudspeakers may be somewhat different compared to how they are typically perceived when reproduced over headphones. However, this is usually not a problem since the "fixed to head orientation" sounds that are rendered by the loudspeakers are typically non-directional or non-critical in terms of spatial localization.

Which audio elements are "not-fixed to head orientation" and which are "fixed to head orientation" may be signaled explicitly by means of metadata in the audio content stream.

In the context of AR (and VR) audio reproduction, the term "diegetic" is also commonly used to describe whether an audio element should be "fixed to head orientation" or not. "Diegetic" describes elements that should remain at the same virtual position when a user moves his head (meaning that the rendered position relative to the user's head must be modified). "Non-diegetic" describes elements for which this is not important, or it may even be preferable that their positions do not take the user's head movements into account (meaning that they will move with, or are "attached" to, the user's head).

In some embodiments, the audio rendering property indicator for an audio element may be indicative of an audio format of the audio element. The selector 209 may be arranged to select whether the first renderer 205 or the second renderer 207 is used for rendering an audio element based on the audio format of the audio element. The audio rendering property indicator may e.g. be indicative the audio element being an audio format from the group of: an audio object format; a Higher Order Ambisonics audio format; and an audio channel signal audio format.

In some embodiments, the selector 209 may be arranged to make the distinction between elements that are to be rendered by the headphones or the loudspeakers based on the format of the audio elements.

E.g.: channel-based or Higher-Order-Ambisonics (HOA) elements, which often are used for transmitting background sounds like music and atmospheric sounds, may be rendered over the loudspeakers, whereas object elements, which are typically used to transmit the main audio elements of a scene (often representing audio sources with well-defined positions), may be rendered over headphones for each user individually. This also enables the user to not only change his head orientation, but also to interact with the individual audio objects (if the content producer has intended the objects to be interactive).

This embodiment may be seen as an alternative or addition to providing audio rendering property indicators that directly define which renderer should be used. For example, in situations where no explicit signaling of whether an audio element is a "not-fixed to head orientation"/"fixed to head orientation" element is included, the selector 209 may evaluate the audio format to determine which renderer 205, 207 should be used.

The approaches and different audio rendering property indicators may be combined, e.g. channel-, HOA-, and elements that are explicitly signaled as "fixed to head orientation" are rendered over the loudspeakers, while objects and "not-fixed to head orientation" elements are rendered over the headphones.

In some embodiments, the audio rendering property indicator may be indicative of an audio source type for the first audio element. For example, the audio rendering property indicator may be indicative of whether the audio element is an audio source type from a set including e.g. one or more of: speech audio; music audio; foreground audio; background audio; voice over audio; and narrator audio.

In some embodiments, the distribution of audio elements over loudspeakers and headphones may be based on indications in the content stream of source types for the audio elements, e.g. metadata like "speech" or "music" or "foreground" or "background sounds". In this example, "speech" sources could be rendered over the headphones, while "music" and "background" sources could be rendered over the loudspeakers. A special case could be speech that is marked as being "voice over" or "narrator", which might best be rendered over the loudspeakers (as it is not intended to have a specific location in space but rather to be "omnipresent").

In some embodiments, the receiver 201 may as previously described also receive visual data indicative of a virtual scene corresponding to the audio scene. This data may be fed to the visual renderer 203 to be rendered using a suitable rendering technique e.g. generating stereo images corresponding to the current user pose.

In some embodiments, the audio rendering property indicator for an audio element may be indicative of whether the first audio element represents an audio source corresponding to a visual scene object. The visual scene object may be an object for which the visual data comprises a visual representation.

In an example where the visual data provides visual data for a viewport, the audio rendering property indicator may indicate whether the audio element is linked to an object within the viewport.

If the audio rendering property indicator indicates that the object corresponding to the audio element is visible in the scene, the selector 209 may decide to render it using headphones and otherwise it may render the audio element using loudspeakers. In some embodiments, the audio rendering property indicator may directly indicate whether the object is visible. However, in other embodiments the audio rendering property indicator may provide an indirect indication of whether the audio element corresponds to a visible scene object.

For example, the audio rendering property indicator may comprise an indicating of a scene object which is represented by the received visual data. The selector 209 may then proceed to evaluate whether the object linked to the audio element is visible for the current listener pose. If so, it may proceed to render it using headphones and otherwise the object may be rendered by loudspeakers.

In some embodiments, the distribution of audio elements over the loudspeakers and headphones may be based on an indication in the received content stream of whether an audio element is linked to a visual element/object in the content stream. If the indicator indicates that this is the case, the audio element is rendered over the headphones. If the indicator indicated that this is not the case, the audio elements is rendered over the loudspeakers.

In the previous examples, the selector 209 has been arranged to select the appropriate renderer 205, 207 based only on the received data. However, it will be appreciated that in many embodiments, further considerations and specifically other data may be considered.

In many embodiments, the apparatus may include a user input function that can receive a user input. The selector 209 may in such embodiments further be arranged to select between the first renderer 205 and the second renderer 207 based on the user input. The user input may for example be a direct indication of a preferred rendering, such as e.g. an explicit indication that a specific audio element should be rendered via headphones rather than loudspeakers. In other embodiments, the user input may be more indirect and may e.g. modify a selection criterion or bias the selection towards one of the renderers 205, 207. For example, a user input may indicate that it is desired for more audio elements to be rendered by headphones and the selector 209 may change a decision criterion to accomplish this.

Thus, in some embodiments, the user may be able to directly impact the distribution of the elements over the loudspeakers and headphones. One example is to give users the possibility to manually designate individual elements for playback over the headphones or loudspeakers.

Another example of distribution control by the user is to provide the user with two, or a few, modes from which he can select; e.g. an "individual experience"— and a "shared experience" mode. In the case in which the user selects the "shared experience" mode, any of the embodiments described above for determining which audio elements should be rendered over the loudspeakers and headphones, respectively, may be used in any combination.

In some embodiments, the selector 209 may itself be arranged to analyze the audio element(s) and determine which renderer 205, 207 to use based on this analysis. For example, if no audio rendering property indicator is received for a given audio element, the selector 209 may proceed to analyze the audio element(s) to determine an audio property, such as for example the number of audio elements in the scene, the number of channels per audio element, the position of audio elements, the distances to the listener(s) (or to each loudspeaker) of audio elements or the movement of the audio elements. The selector 209 may then proceed to decide which renderer 205, 207 to use based on this audio property or on a plurality of these.

In a specific example configuration, henceforth referred to as configuration X, the selector 209 may select the renderer for each audio element in order to produce the most accurate spatial representation of the audio scene. For instance, if an audio element as a virtual position relatively close to the position of one of the physical loudspeakers then it might be rendered on that specific loudspeaker. Conversely, if an audio element falls in an area not covered by any loudspeaker then it may be rendered through the headphones. The fact that an audio element has the same direction as a loudspeaker (from the view point of a listener) can also be used in the same way for a single listener, and also for multiple listeners but with the condition that they all align with the speaker. However, this is typically not practical as the users might change positions over time. In this specific configuration X, the angular precision of the (binaural) headphone renderer 207 might be taken into account by the selector 209 for taking this decision.

Thus, in some embodiments, the selection of the appropriate renderer 205, 207 may additionally be based on an analysis of the audio signals. For example, an estimator of an acoustical property of the audio signals can be used to determine properties such as the distance (or the speed) of the audio object/source (especially in the case of multichannel signals) or the reverberation time. Audio signal classifiers can also be used such as speech/music classifiers, music genre classifiers or audio event classifiers. A particular type of classifiers could also be used to determine which type of microphones (HOA, Lavalier mic, omnidirectional, XY . . . ) has been used to record a given signal. An analysis of the frequency distribution of the audio signal might also be used to decide which audio system (headphone or loudspeaker) is more suitable for rendering the whole audio element.

In the previous examples, the selector 209 has been arranged to select either the first renderer 205 or the second renderer 207 on an audio element by audio element basis. However, it will be appreciated that this is not necessary or essential. For example, in some embodiments, the selector 209 may be arranged to select which renderer 205, 207 to use for groups of audio elements.

Also, in some embodiments, the selector 209 may be arranged to separately select between the renderers 205, 207 for different parts of a single audio element. For example, for some audio elements one part may be rendered by the first renderer 205 and another part may be rendered by the second renderer 207.

It will be appreciated that an audio element may be divided into different parts in different ways depending on the requirements and preferences of the individual embodiment. For example, in some embodiments, the audio element may be received as a combination or collection of different parts and the selector 209 may individually select a renderer 207 for each part. For example, an audio element may represent a specific audio source by a first component which represents an audio source with a well-defined position (e.g. corresponding to direct audio) and a second component which represents more diffuse and distributed sound (e.g. corresponding to reverberating sound). The selector 209 may in such a scenario be arranged to render the first component using headphones and the second component using loudspeakers.

In other embodiments, the selector 209 may be arranged to divide the audio element into different parts for rendering. For example, a received audio element may correspond to an audio signal which may be analyzed in order to be divided into different parts that may then be rendered separately.

Specifically, in many embodiments, different parts of the audio element may correspond to different frequency ranges. For example, the selector 209 may for a given first part corresponding to a specific frequency range be arranged to select which renderer 205, 207 to use. It may proceed to do the same for a different frequency range and thus may lead to different renderers 205, 207 being used for the first and second frequency ranges.

In some embodiments, different audio rendering property indicators may be provided for different parts of the audio element, and the selector 209 may consider the specific audio rendering property indicator for the given part when deciding how to render this. In other embodiments, an audio rendering property indicator may be provided for the whole audio element but with different decision criteria being used for different parts. For example, for a medium to high frequency range, the selection between headphones and loudspeakers is made in dependence on the received audio rendering property indicator for the audio element, whereas for a very low frequency range the first renderer 205 is used to render the signal over the loudspeakers independently of what the audio rendering property indicator indicates (reflecting that low frequencies tend to provide much less significant spatial cues).

For example, the signal may be separated into a low-frequency part and a high-frequency part, using low and high-pass filtering, where the low frequency part is sent to the loudspeakers and the high frequency part to the headphones dependent on the audio rendering property indicator.

In some such embodiments, advanced audio source separation may be used (e.g. dividing each time-frequency point between renderers).

The use of a filtering that preserves the energy at each time frequency point may enable a physical hybrid rendering system to attenuate the possible errors generated by the filtering.

The described approach may provide a number of advantageous effects including as previously described allowing a perceived accurate spatial rendering of an audio scene while allowing/facilitating users in the same location to interact directly.

The approach may reduce complexity and resource usage in many scenarios due to a potentially reduced amount of binaural processing being required. Another advantage that can often be achieved is a reduction in the energy used by the headphone reproduction system, e.g. in terms of amplifier power and/or processing load for the embedded renderer, which can be critical in the case of untethered headphones (e.g. battery driven headphones).

Another interesting property of hybrid audio reproduction system for VR application is that it tends to provide improved safety. Indeed, contrary to wearing closed headphones, the attendees are not fully cut off from the potential danger of the real environment surrounding them. This may be an important factor in many practical situations.

Yet another advantage of a hybrid system such as those described, is the fact that part of the audio content is rendered over the common loudspeaker set which tends to enhance the users' feeling of a shared experience. The approach tends to provide an improved user experience.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:
1. An audio apparatus, comprising:
a receiver circuit,
wherein the receiver circuit is arranged to receive data,
wherein the data describes an audio scene,
wherein the data comprises audio data and metadata,
wherein the audio data is for a set of audio elements corresponding to audio sources in the scene,
wherein the set of audio elements comprises a first audio element
wherein the metadata comprises at least a first audio rendering property indicator,
wherein the first audio rendering property indicator is for the first audio element;
a first renderer circuit, wherein the first renderer circuit is arranged to render audio elements by generating a first set of audio signals for a set of loudspeakers;
a second renderer circuit, wherein the second renderer circuit is arranged to render audio elements by generating a second set of audio signals for headphones; and
a selector circuit, wherein the selector circuit is arranged to select between the first renderer circuit and the second renderer circuit such that the rendering of at least a first portion of the first audio element is in response to the first audio rendering property indicator;
wherein the first audio rendering property indicator is indicative of whether the first portion of the first audio element should be rendered via the loudspeakers, or rendered via the headphones,
wherein the selector circuit is arranged to select between the first renderer circuit and the second renderer circuit for the first portion of the first audio element,
wherein the selector circuit is arranged to select between the first renderer circuit and the second renderer circuit for a second portion of the first audio element.
2. The apparatus of claim 1,
wherein the apparatus is arranged to generate audio signals for a plurality of listeners,
wherein the first renderer circuit is arranged to generate the first set of audio signals as a common set of audio signals for the plurality of listeners,
wherein the second renderer circuit is arranged to generate the second set of audio signals for headphones for a first listener of the plurality of listeners,
wherein the second renderer circuit is arranged to generate a third set of audio signals for headphones for a second listener of the plurality of listeners.
3. The apparatus of claim 1, wherein the first portion is a first frequency subrange of the first audio element,
wherein the second portion is a second frequency subrange of the first audio element,
wherein the selector circuit is arranged to select the first renderer circuit for the first portion of the first audio element,
wherein the selector circuit is arranged to select the second renderer circuit for the second portion of the first audio element.
4. The apparatus of claim 1, wherein the first audio rendering property indicator is indicative of an audio format of the first audio element.
5. The apparatus of claim 1, wherein the first audio rendering property indicator is indicative of a guidance rendering property for the rendering of the first audio element.
6. The apparatus of claim 5, wherein the first audio rendering property indicator explicitly indicates that the first portion of the first audio item is intended for rendering via the loudspeakers, or explicitly indicates that the first portion of the first audio item is intended for rendering via the headphones.
7. The apparatus of claim 1,
wherein the circuit is arranged to receive visual data,
wherein the visual data is indicative of a virtual scene corresponding to the audio scene,
wherein the first audio rendering property indicator is indicative of whether the first audio element represents an audio source corresponding to a visual scene object.
8. The apparatus of claim 1, further comprising a user input circuit,
wherein the user input circuit is arranged to receive a user input,
wherein the selector circuit is arranged to select between the first renderer circuit and the second renderer circuit for rendering of at least the first portion of the first audio element in response to the user input.
9. The apparatus of claim 1,
wherein the first audio rendering property indicator indicates an audio source type of the first portion of the first audio element,
wherein the selector circuit is arranged to select between the first renderer circuit and the second renderer circuit for rendering the first portion of the first audio element based on the audio source type of the first portion of the first audio element.
10. The apparatus of claim 1,
wherein the selector circuit is arranged to determine an audio property of the first audio element,
wherein the selector circuit is arranged to select between the first renderer circuit and the second renderer circuit for rendering at least the first portion of the first audio element in response to audio property.
11. The apparatus of claim 1,
wherein the second portion of the first audio element comprises frequencies higher than the first portion of the first audio element,
wherein the selector circuit is configured to select the first renderer circuit for rendering the first portion of the first audio element, wherein the selector circuit is configured to select between the first renderer circuit and the second renderer circuit for rendering the second portion of the first audio element,
  wherein the selecting between the first renderer circuit and the second renderer circuit for rendering the second portion of the first audio element is based on the first audio rendering property indicator.
12. An audio apparatus, comprising:
a receiver circuit,
  wherein the receiver circuit is arranged to receive data,
  wherein the data describes an audio scene,
  wherein the data comprises audio data and metadata,
  wherein the audio data is for a set of audio elements corresponding to audio sources in the scene,
  wherein the set of audio elements comprises a first audio element
  wherein the metadata comprises at least a first audio rendering property indicator,
  wherein the first audio rendering property indicator is for the first audio element;
a first renderer circuit, wherein the first renderer circuit is arranged to render audio elements by generating a first set of audio signals for a set of loudspeakers;
a second renderer circuit, wherein the second renderer circuit is arranged to render audio elements by generating a second set of audio signals for headphones; and
a selector circuit, wherein the selector circuit is arranged to select between the first renderer circuit and the second renderer circuit such that the rendering of at least a first portion of the first audio element is in response to the first audio rendering property indicator;
wherein the first audio rendering property indicator is indicative of whether the first portion of the first audio element should be rendered via the loudspeakers, or rendered via the headphones,
wherein the first audio rendering property indicator indicates whether the first portion of the first audio element is foreground audio or background audio,
wherein the selector circuit is arranged to determine that the first portion of the first audio element should be rendered via the loudspeakers when the first portion of the first audio element is indicated to be background audio,
wherein the selector circuit is arranged to determine that the first portion part of the first audio element should be rendered via the headphones when the first portion of the first audio element is indicated to be foreground audio.
13. A method of audio processing, comprising:
receiving data describing an audio scene,
  wherein the data comprises audio data for a set of audio elements,
  wherein the set of audio elements correspond to audio sources in the scene and metadata,
  wherein the metadata comprises at least a first audio rendering property indicator,
  wherein the first audio rendering property indicator is for a first audio element of the set of audio elements;
rendering audio elements by generating a first set of audio signals for a set of loudspeakers;
rendering audio elements by generating a second set of audio signals for headphones;
in response to the first audio rendering property indicator, selecting between:
rendering at least a first portion of the first audio element via the set of loudspeakers, and rendering at least the first portion of the first audio element via the headphones,
  wherein the first audio rendering property indicator is indicative of whether the first portion of the first audio element should be rendered via the loudspeakers, or rendered via the headphones; and
selecting different rendering for the first portion of the first audio element and for a second portion of the first audio element.
14. A computer program stored on a non-transitory medium, wherein the computer program when executed on a processor performs the method as claimed in claim 13.
15. The method of claim 13, further comprising:
generating audio signals for a plurality of listeners;
generating the first set of audio signals as a common set of audio signals for the plurality of listeners;
generating the second set of audio signals for headphones for a first listener of the plurality of listeners; and
generating a third set of audio signals for headphones for a second listener of the plurality of listeners.
16. The method of claim 13, wherein the first portion is a frequency subrange of the first audio element.
17. The method of claim 13, wherein the first audio rendering property indicator explicitly indicates that the first portion of the first audio item is intended for rendering via loudspeakers, or explicitly indicates that the first portion part of the first audio item is intended for rendering via headphones.
18. The method of claim 13,
  wherein the first audio rendering property indicator indicates an audio source type of the first portion of the first audio element,
  wherein selecting between rendering of at least a first portion of the first audio element via the set of loudspeakers and rendering of at least the first portion of the first audio element via the headphones, is in response to the audio source type.
19. The method of claim 13,
  wherein the first audio rendering property indicator indicates whether the first portion of the first audio element is foreground audio or background audio,
  wherein first audio element is rendered via the loudspeakers when the first portion of the first audio element is indicated as background audio,
  wherein the first portion of the first audio element is rendered via the headphones when the first portion of the first audio element is indicated as foreground audio.
20. The method of claim 13, further comprising:
rendering of the first portion of the first audio element via the set of loudspeakers; and
rendering of the second portion of the first audio element via the headphones,
  wherein the second portion comprises frequencies higher than the first portion.

* * * * *